Figure 1:
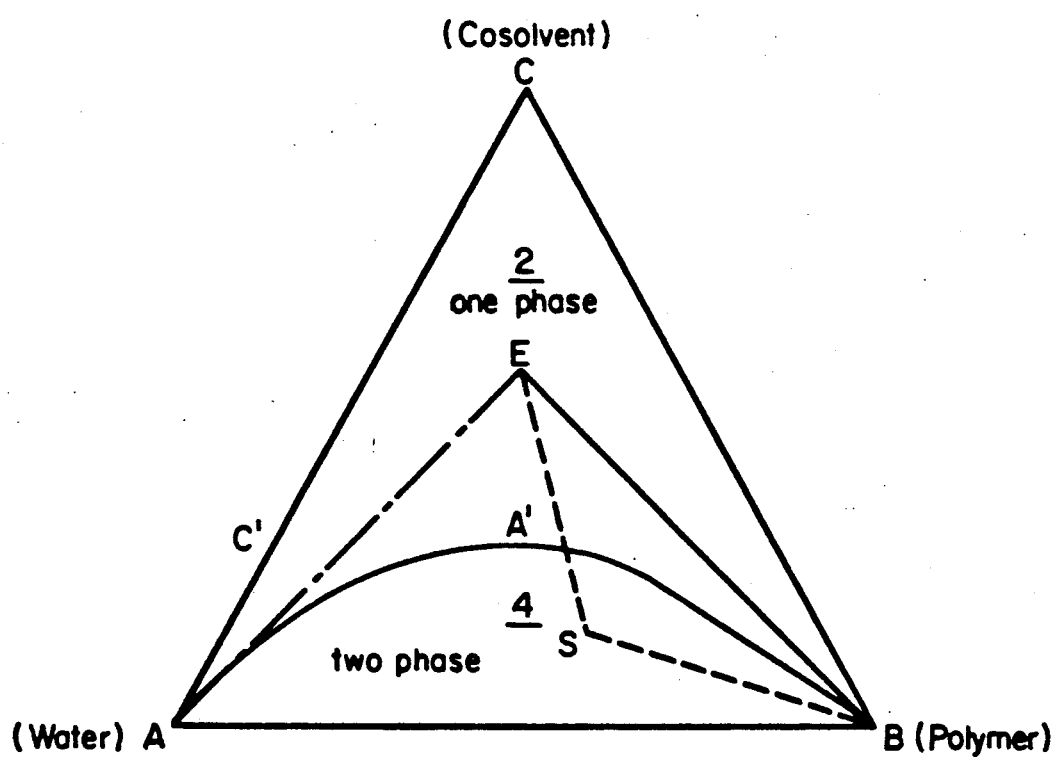

United States Patent [19]

Hoy et al.

[11] Patent Number: 5,039,759
[45] Date of Patent: Aug. 13, 1991

[54] WATER BORNE HIGH SOLIDS COATING COMPOSITIONS

[75] Inventors: Kenneth L. Hoy, St. Albans; Forrest A. Richey, Jr., Charleston, both of W. Va.

[73] Assignee: Technology Corporation United Carbide Chemicals and Plastics, Danbury, Conn.

[21] Appl. No.: 761,511

[22] Filed: Aug. 1, 1985

[51] Int. Cl.$^5$ ............................................. C08F 20/00
[52] U.S. Cl. ................................ 525/437; 524/211; 524/512; 525/447
[58] Field of Search ............... 524/211, 512; 525/437, 525/447

[56] References Cited

U.S. PATENT DOCUMENTS

| | | | |
|---|---|---|---|
| 3,392,129 | 7/1968 | Hoy | 260/22 |
| 3,412,054 | 11/1968 | Milligan et al. | 260/18 |
| 3,440,192 | 4/1969 | Hoy et al. | 260/22 |
| 3,455,806 | 7/1969 | Spoor et al. | 204/181 |
| 3,893,956 | 7/1975 | Brandt | 524/211 |
| 3,959,106 | 5/1976 | Bosso et al. | 204/181 |
| 3,962,165 | 6/1976 | Bosso et al. | 260/29.2 EP |
| 3,984,299 | 10/1976 | Jerabek | 204/181 |
| 4,096,127 | 6/1978 | Schurmann et al. | 260/77.5 AM |
| 4,108,001 | 8/1978 | Smith et al. | 524/211 |
| 4,136,075 | 1/1979 | Finn et al. | 260/29.67 A |
| 4,314,918 | 2/1982 | Birkmeyer et al. | 525/443 |
| 4,317,894 | 3/1982 | Lewarchik et al. | 525/437 |
| 4,322,328 | 3/1982 | Graetz et al. | 524/458 |
| 4,417,022 | 11/1983 | Chang et al. | 524/598 |
| 4,520,167 | 5/1985 | Blank et al. | 525/131 |

FOREIGN PATENT DOCUMENTS 0021454  2/1979  Japan ................................. 524/211

Primary Examiner—Joseph L. Schofer
Assistant Examiner—J. M. Reddick
Attorney, Agent, or Firm—Norman L. Balmer

[57] ABSTRACT

Water borne high solids coating compositions are made by blending a water-dispersible, crosslinkable organic polymer free of amide groups, water, at least one reactive urea derivative, a crosslinking agent and optionally a crosslinking catalyst. Optionally a mixture of reactive urea and carbamate derivatives can be used.

The resultant water borne high solids coating compositions can be either solutions or dispersions depending upon the particular polymer and reactive urea or carbamate chosen as the reactive cosolvent or reactive diluent.

20 Claims, 3 Drawing Sheets

WATER BORNE HIGH SOLIDS COATING COMPOSITIONS

FIELD OF THE INVENTION

This invention pertains to the preparation of high solids coating compositions and more particularly to the use of substituted ureas as reactive cosolvents and/or reactive diluents together with water to form the liquid vehicle for the application of film forming polymers. The resultant water borne high solids coating compositions can be either solutions or dispersions depending upon the particular polymer and substituted urea chosen as the reactive cosolvent or reactive diluent.

Water borne high solids coating compositions as used herein are coatings in which the principal application medium is a mixture of water and an essentially non-volatile organic material capable of reacting with the base film forming polymer and/or crosslinking agent. They may be of two types (1) dispersions of organic polymers (latex) to which the co-reactive organic (reactive diluent) materials may also serve as filming aids, antifreeze agents, defoamers, etc.; and (2) solutions of organic polymers in which the thinner is a mixture of an organic co-reactive material (reactive cosolvent) and water. It is the intent of this invention to disclose the preparation of water borne high solids coating compositions in which the reactive organic material is also a solvent or dispersant as well as essentially non-volatile and as a consequence many of the problems associated with the prior art "organic solvent borne" and "water borne coatings" are circumvented.

BACKGROUND ART

The employment of solutions or dispersions of organic polymers dissolved or dispersed in volatile organic liquids to formulate organic polymer coating compositions and their subsequent application onto various substrates as coatings thereon requires the handling and evaporation of large quantities of organic solvents. Because of the undesirable ecological and environmental problems and problems associated with the exposure of workers in the coatings industry to the organic solvents, alternate coatings methods become a necessity. Consequently there has been a shift to coating techniques where water is substituted for much of the volatile organic solvent or diluent in the coating composition. These are often referred to as "water borne" coating compositions even where water is not the sole dispersing or dissolving vehicle for the organic polymer.

The rise in the use of water borne coatings has introduced problems peculiar to systems containing a mixture of water and organic cosolvent or dispersant. These problems arise from the fact that the evaporation of water is dependent upon the ambient humidity conditions, and the relative rates of evaporation of the organic solvent vis a vis water.

Polymers which were developed for water borne coatings systems were often based on the chemistry of the polymers used in existing solvent systems. Thus alkyds, epoxy esters, and oil modified polyurethanes originally developed for nonaqueous formulations were modified for aqueous formulations by the incorporation of acid moieties.

One of the earliest techniques for the incorporation of acid groups was to maleinize a long oil alkyd or epoxy ester. In this process the alkyd or polyester is reacted at 200°-260° C. for 30-60 minutes with maleic anhydride in the presence of an excess of drying acid. The excess drying acid serves as a reactive chain transfer agent to prevent premature gelation. Accelerators, commonly iodine or sulfur dioxide, were often employed in this thermal polymerization process. The maleic anhydride moiety (now a succinate) is hydrolyzed and neutralized with volatile and/or fixed bases to render the polymer soluble in the water/cosolvent mixture. Enough unsaturation is left in the resin for siccative cross-linking of the final film.

Another early technique was to use dimethylol propionic acid (derived by condensation of propanal with formaldehyde followed by oxidation). This unique acid-diol along with the monoglyceride is reacted with the phthalic anhydride or isophthalic acid to form a polyester/alkyd having free acid groups. The carboxyl moiety of the dimethylol propionic acid is sterically hindered and does not esterify during the polymerization but reacts subsequently with the neutralizing base thus solubilizing the polymer.

Oil modified urethanes are produced by substitution of a diisocyanate for the phthalic anhydride. The urethane reaction is carried out at moderate temperatures (50°-100° C.). These types of polymers form the basis of water borne coatings materials used today in low cost product and consumer finishes.

The next innovation was the development of resins that could be cross-linked by reaction with aminoplasts. These resins contained available hydroxyl functionality as well as an ionizable moiety. The acid containing polymers were used early in electro-coating, and were synthesized by partially esterifying an epoxy resin with a drying fatty acid followed by reaction with trimellitic anhydride. The carboxyl groups incorporated were neutralized in the usual manner. Esterification of the partial epoxy ester with para-aminobenzoic acid in place of trimellitic anhydride yielded early cationic polymers. The cationic polymers are, commonly neutralized with acetic, lactic and other volatile organic acids to attain solubility.

Today the resins are highly specialized for their intended applications. Techniques for the incorporation of the ionic moieties include graft polymerization of carboxylic vinyl monomers to the base epoxy and polyester backbones as well as the development of functionalized telechelic polymers from readily available monomers.

As the coatings industry moves, because of environmental and health regulations, from the more conventional solvent coatings to water borne and high solids systems, there has developed a need for new water borne reactive diluents and reactive cosolvents to serve this emerging technology. At the present time many of these end use needs are being addressed by solvents and reactive materials already in commerce. However, none of these materials were designed for these applications; rather the industry adapted what was available. Today the state of the art has advanced to the point where the real needs are apparent and further improvement in the coating systems requires improved reactive co-solvents and reactive diluents as well as polymers.

For example many of the prior art resin solvents used in water borne coating systems led to degraded polymer properties in the final coatings. Water borne coatings as used herein are coatings in which the principal application medium is water. They may be of two types: (1)

dispersions in which organic materials are added at low levels as filming aids, antifreeze additives, defoamers, etc.; (2) solutions in which part of the application medium is an organic solvent. Performance requirements demand that coatings resist the adverse effects of water in the environment and yet in water borne solution coatings technology they are applied from a solution which contains a large fraction of water. This requires that the coatings are not truly water soluble; rather, a number of techniques are employed to maintain solubility throughout application and film formation. The techniques commonly employed are:

(a) Ionic groups are incorporated into the polymer,
(b) A means of crosslinking the film after application is employed,
(c) A cosolvent is used to maintain solubility of the polymer throughout the film forming process.

In the case of solution coatings, it is imperative that during the drying stage, after a particular substrate has been covered with a layer of coating composition that a single phase be maintained until the water and cosolvent components have evaporated away leaving the now insoluble organic polymer deposit. It is also necessary that the cosolvent be miscible with the water and that the organic polymer coatings be soluble in the cosolvent.

The relative volatility of the cosolvent with respect to water involves vapor pressure, molecular weight and the relative humidity during the drying operation. Under high humidity conditions the rate of water evaporation becomes very slow while the evaporation of the volatile organic co-solvent remains relatively constant. Consequently under conditions of high humidity, coatings imperfections develop during film formation which are detrimental to the overall performance of the coatings. These imprefections which form under high humidity conditions are related to the limited solubility of the film forming polymers in the resulting water rich composition. The problem becomes understandable when it is cast in terms of the phase chemistry of a water borne coating.

A simplified phase diagram of a hypothetical water borne system is illustrated in FIG. 1. FIG. 1 is a phase diagram representing water as A, the cosolvent as C and the film forming polymer as B. The area of a single phase, 2, is separated from the area of two phases, 4, by the curved line A-A'-B. The point E represents the application composition of the water borne system. In the case of a volatile cosolvent under ideal conditions (low humidity) the straight line E-B represents the changing composition during film formation. Under conditions of high humidity the dotted line E-S-B illustrates that the film formation pathway has taken an excursion into the two phase region which causes premature coagulation of the film forming polymer and results in coating imperfections.

The points illustrated by FIG. 1 are:
(i) The cosolvent is miscible with water; line AC is in the one phase region in its entirety.
(ii) The coatings polymer is soluble in the cosolvent; line CB is in the one phase region in its entirety.
(iii) Film formation must take place in such a manner that the phase boundary, A-A'-B, is not crossed.
(iv) Lastly, it is often desired to clean the application equipment with water alone, which means the phase boundary, A-A'-B, must be avoided during cleaning; line EA.

In real systems the phase diagrams are more complicated than illustrated. The shape of the two phase region is more irregular and is not as predictable as indicated. The model does, however, provide a framework for understanding solubility relationships and provides a common basis for understanding the objectives of the present invention.

It is an object of this invention to provide non-volatile, reactive organic materials which are also solvents or diluents suitable for the preparation of water borne high solids coating compositions.

It is another object to provide reactive solvents/reactive diluents which serve to provide high solids coating compositions in the form of either solutions or aqueous dispersions.

It is still another object to provide reactive solvents/reactive diluents which will not degrade the polymers used in the coatings compositions or the properties of the finished coating.

Other objects will become apparent to those skilled in the art upon a further reading of the specifications.

Figure 2:
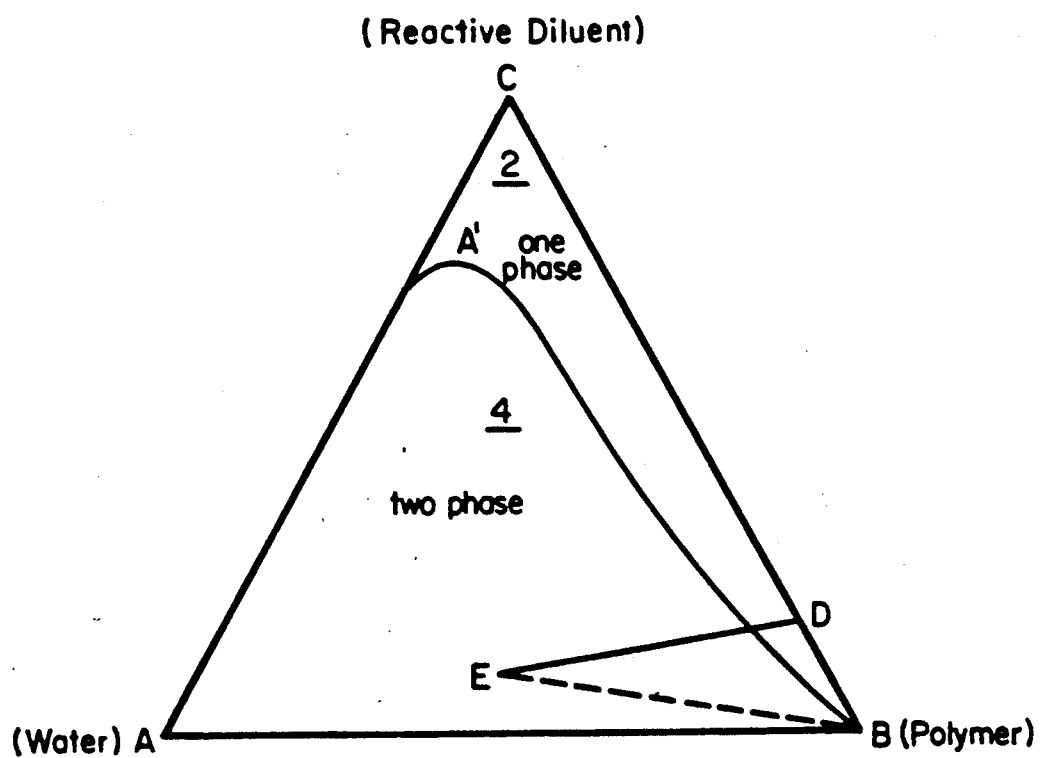

Water borne high solids coatings avoid many of the problems referred to earlier. Again the advantage of water borne high solids coatings compositions can be illustrated by use of phase diagrams. Since water borne high solids coatings may be either of the dispersion type or the solution type, two different phase diagrams will be required to understand the phase relationships. FIG. 2 is a simplified, hypothetical phase diagram of a water borne high solids dispersion coating composition, representing water as A, the reactive diluent as C, and the polymer including the crosslinker as B. The area of single phase, 2, is separated from the area of two phases, 4, by the curved line A-A'-B. The point E represents the application composition of the water borne high solids dispersion coating. The straight line E-D represents the changing composition during film formation; the dashed line E-B is the film forming pathway that the water borne coating of the prior art would take.

The salient features of the phase diagram are:
(i) The reactive diluent need not be totally soluble in water, but rather is distributed between the aqueous phase and the polymer phase.
(ii) The reactive diluent is essentially non-volatile and becomes a part of the final coating and consequently the total non-volatiles (total solids) in the composition in the final film, point D, is equal to the sum of the polymer including the crosslinker and the reactive diluent.
(iii) The film forming pathway proceeds from a homogeneous, stable two phase composition to a single phase and therefore the reactive diluent must be compatible (soluble in) with the polymer phase.

Figure 3:
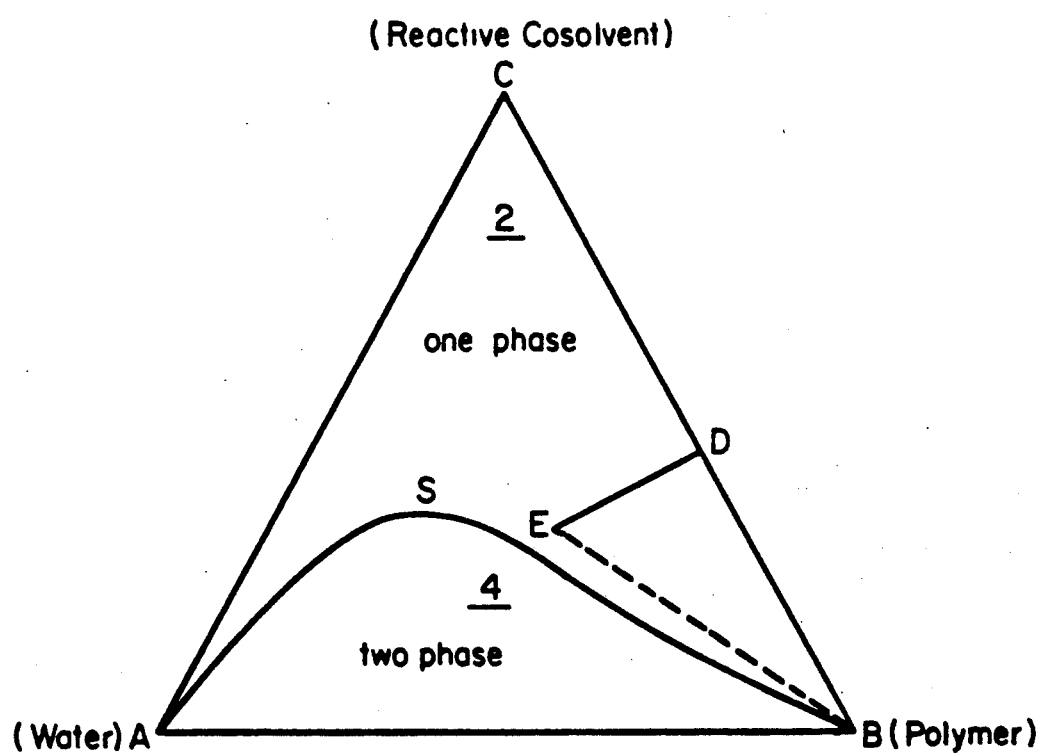

FIG. 3 is a phase diagram of a water borne high solids solution coatings composition representing water as A, the reactive cosolvent as C, and the polymer including the crosslinking agent as B. The area of single phase, 2, is separated from the area of two phases, 4, by the curved line A-A'-B. The point E represents the application composition of the water borne high solids solution coating. The straight line E-D represents the changing compositions during the film formation process.

The notable features of FIG. 3 are:
(i) The reactive cosolvent is generally miscible with water; line A-C is in the one phase region in its entirety.

(ii) The coatings polymer is soluble in the reactive cosolvent; line CB is in the one phase region in its entirety.

(iii) Film formation can result only from the removal of water (evaporation) and hence the film formation remains in the single phase region thus avoiding the high humidity film defects of the prior art.

(iv) The reactive cosolvent is essentially non-volatile and becomes a part of the final coating and consequently, the total non-volatiles (total solids), in the film composition, point D, is equal to the sum of the polymer including the crosslinker and the reactive cosolvent.

In both cases the reactive diluent and/or reactive cosolvent becomes a part of the final coating and as such must contribute to, not detract from, the overall coatings performance. The reaction product of polymer, reactive diluent and/or reactive cosolvent with the crosslinking agent must have suitable properties such as toughness, adhesion, impact resistance, abrasion resistance, scratch resistance, resistance to solvents, chemicals, acids, bases, and have good color, gloss and stability as is required according to the end use application. This is well understood by those skilled in the art.

SUMMARY OF THE INVENTION

Water borne high solids coating compositions meeting the objects above can be prepared by blending;

(1) at least one water dispersible, crosslinkable organic polymer free of amide groups;
(2) water;
(3) at least one reactive urea derivative having the generic formula:

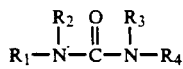

wherein
each of $R_1$, $R_2$, $R_3$ and $R_4$ is a monovalent radical selected from the class consisting of hydrogen, alkyl groups having 1 to about 10 carbon atoms, hydroxyalkyl groups having 2 to about 4 carbon atoms and one or more hydroxyl groups, and hydroxypolyalkyleneoxy groups having one or more hydroxyl groups and with the provisos that:
 (i) said urea contains at least one —NH and one —OH group or at least two OH groups or at least two —NH groups;
 (ii) $R_1$ and $R_2$ or $R_1$ and $R_3$ can be linked to form a ring structure; and
 (iii) $R_1$, $R_2$, $R_3$ and $R_4$ are never all hydrogen at the same time;
(4) A crosslinking amount of a crosslinking agent; and
(5) Optionally, a catalytic amount of a crosslinking catalyst.

Except for hydrogen, the monovalent radicals may be substituted with ether, halogen, quaternary ammonium, sulfonium, phosphonium and like substituents.

Suitable water dispersible organic polymers for use in the present invention include anionically, cationically, and entropically stabilized polymers which contain a plurality of reactive —OH and/or —NHCOO—groups. The prior art contains a plentitude of routes for incorporation of the entities required to impart homogeneous water dispersibility into various organic polymers. The following list is by no means complete, but will serve to illustrate some of the more important routes to obtain operable polymers.

Anionically stabilized polymers were probably the earliest water borne polymers. Hoy et al. (U.S. Pat. No. 3,392,129) teaches the use of carboxylation of unsaturated fatty acid ester of polyether polyols and their subsequent neutralization with organic amine bases to render the polymer soluble in a water/cosolvent blend. Hoy and Payne (U.S. Pat. No. 3,440,192) describes the preparation of water borne fatty acid polyesters by the introduction of carboxyl groups. Milligan and Hoy (U.S. Pat. No. 3,412,054) demonstrates the synthesis of water borne polyurethanes via the reaction of dimethyolpropionic acid and subsequent neutralization. Schurmann (U.S. Pat. No. 4,096,127) describes the use of tertiary ammonium dimethyolpropionate to prepare polyurethanes thus avoiding the subsequent neutralization step. Shell Chemical Co. in their trade publication of 1965 describe water borne coatings from partial fatty acid epoxy esters and their subsequent reaction with trimelitic anhydride. Jerabek (U.S. Pat. No. 3,984,299) shows the reaction of primary and secondary amines with an epoxy resin to produce a polymer which when neutralized with acetic or lactic acid provides a water borne cationically stabilized polymer. In a like manner Bosso and Wismer (U.S. Pat. Nos. 3,962,165 and 3,959,106) show the reaction of sulfides and phosphines to give products which could be converted to sulfonium and phosphonium water dispersible salts with organic acids. Kempter et al, Fatipec Congress (1978), describe the preparation of a Mannich base polyamine from bis phenol-A, formaldehyde and a lower alkyl secondary amine; the resultant Mannich base was reacted with an epoxy resin to form a pendant amine containing polymer, which was soluble when acid neutralized in a water/cosolvent blend. Spoor et al (U.S. Pat. No. 3,455,806) shows the polymerization of dialkylaminoethyl methacrylate with methyl methacrylate, and hydroxyethyl methacrylate to make a cationically stabilized acrylic polymer. This is the cationic analogue of an anionic acrylate made from methacrylic or acrylic acid and neutralized with amines as described typically by Finn et al. (U.S. Pat. No. 4,136,075). Graetz, et al. (U.S. Pat. No. 4,322,328) describes entropically stabilized water borne latexes from acrylate monomers using the methacrylic acid ester of the monomethyl ether of polyethyleneglycol, mole wt. 2000, as the key generator of the entropic barrier. It describes the use of these sterically stabilized dispersions in water borne coatings. The common feature of all of these methods is that homogeneous water dispersible polymers are obtained each of which is capable of having a plurality of reactive —OH and/or —NHCOO— groups which provide for inter polymerization with the subject ureas and the cross linking agent.

Preferred water dispersible, crosslinkable organic polymers for use in this invention include:
Polyester alkyd resins
Carboxylated hydroxyl-containing epoxy fatty acid esters
Carboxylated polyesters
Carboxylated alkyd resins
Carboxylated acrylic interpolymers free of amide groups
Carboxylated vinyl interpolymers, such as styrene/acrylic copolymers.

The ratio of the amounts of water and reactive diluent or cosolvent used to prepare the coating compositions is dictated by the type of water borne coating desired. Thus in the aqueous dispersion type, the amount of reactive diluent is usually determined by the film properties desired. Usually these can be attained by ratios of reactive diluent/water in the range of about 5/95 to about 30/70. On the other hand in the solution type the ratio of reactive cosolvent to water is limited by the solubility characteristics of the water dispersible polymer. Thus a hydrophilic polymer would require less reactive cosolvent while a more hydrophobic polymer would require more. Generally, polymers of these types are soluble in a blend of reactive cosolvent/water of about 20/80 to about 60/40. In practice the base coating may be formulated at rather high ratios of reactive cosolvent/water i.e., about 60/40 to about 90/10 and then let down with water to attain application viscosities. One skilled in the art can easily establish the optimum ratios for a particular coating composition with a minimum of experimentation. The amount of organic polymer used in these compositions is not narrowly critical. However a practical range for the solution type is about 15 to about 45% by weight of polymer with the amount of reactive solvent being about 10 to about 20% by weight, the amount of crosslinker being about 10 to about 30% by weight and the amount of water being about 60 to about 5% by weight.

A practical range of organic polymer used for the dispersion type of coating composition is about 35 to about 50% by weight, with the amount of reactive diluent being about 5 to about 20% by weight, the amount of crosslinker being about 5 to about 20% by weight and the amount of water being about 55 to about 10% by weight.

The reactive urea derivatives in the coating composition claimed herein can be designated as either reactive cosolvents or reactive diluents depending on the type of coatings formed. In the case of coating composition which are dispersions, the ureas function as reactant diluents. In the case of coatings compositions which are solutions, the ureas function as reactive cosolvents.

The term reactive is used herein to mean that the urea derivatives can be incorporated into the finished coating by crosslinking agents which cure through NH and/or OH groups.

The reactive ureas used in this invention may be represented by the following:
N-(2-hydroxyethyl)-N,N'-ethylene urea
N-(2-hydroxyethyl)-N'-butyl urea
N,N-bis(2-hydroxyethyl)-N'-butyl urea
N,N-bis-(2-hydroxyethyl) urea
N,N'-bis-(2-hydroxyethyl) urea
N-(2-hydroxy-1-propyl)-N'-butyl urea
N,N'bis-(3-hydroxy-2,2-dimethyl-1-propyl) urea
N,N'-dimethyl urea
tetrakis-(2-hydroxyethyl) urea
tris-(2-hydroxyethyl) urea
N,N'-bis-(2-hydroxyethyl)-N,N'-ethylene urea
N-(2-hydroxyethyl)-N'-methyl urea
N,N'-bis-(2-hydroxyethyl)-N-ethyl urea
N,N'-bis-(2-hydroxyethyl)-N,N'-diethyl urea
N,N'-bis-(2-hydroxyethyl)-N,N'-dimethyl urea
N,N,N'-tris-(2-hydroxyethyl)-N'-methyl urea
N,N'-diethyl urea
N-butyl-N'-(2-ethyl-1-hexyl) urea
N-butyl-N'-propyl urea
N-methyl-N'-butyl urea
N-methyl-N'-2-propyl urea Illustrative of suitable crosslinking agents for the water borne high solids coating compositions described herein are water soluble or water dispersible polyepoxides, such as the glycidyl epoxies or cycloaliphatic epoxies (Araldite® 297, Epon® 582, etc.) and the water dispersible aminoplasts such as the reaction product of an aldehyde (e.g. formaldehyde, acetaldehyde, paraformaldehyde, trioxane etc.) with urea, thiourea, melamine, benzoguanamine, acetoguanamine, dicyandiamine and the like. The aminoplasts may be etherified with a lower alcohol such as methyl, ethyl, butyl, isobutyl, propyl or isopropyl alcohol. Aminoplasts which are of particular value in anionically stabilized water borne high solids coating compositions are the methylated urea-formaldehyde resins, the alkylated benzoguanamines and methylated melamine-formaldehyde resins with the latter being the most desirable.

The choice of catalysts suitable for the practice of this invention is dictated by the choice of crosslinking reaction. Thus if aminoplasts are employed to crosslink the organic polymer and reactive urea, an acidic catalyst is preferred. Illustrative of the acidic catalyst of the invention are one or more of the following: alkysulfonic acids such as methane sulfonic acid, ethane sulfonic acid and the like, arylsulfonic acids such as p-toluene sulfonic acid, alkylaryl sulfonic acid acids such as a $C_{10}$ to $C_{18}$ alkylbenzene sulfonic acid, sulfamic acid, dialkyl hydrogen phosphates such as diamyl hydrogen phosphate, aryl hydrogen phosphates such as diphenyl hydrogen phosphate and phosphoric acid itself. Often these catalysts are rendered water dispersible by neutralization with lower alkyl amines.

When cationically stabilized water dispersible organic polymers are employed, the basic character of the base resin retards the reaction with an aminoplast and extremely high temperatures must be employed. To circumvent this problem the blocked isocyanates are often employed to crosslink these polymers. The polymer isocyanates have been extensively reviewed by Wicks (Prog. Org. Chem., 3, 73 (1975)). A blocked isocyanate is an isocyanate adduct which is stable at ambient conditions but dissociates to regenerate isocyanate functionality under the influence of heat. Temperatures of 120° to about 250° C. are necessary to release the blocking groups which are usually volatilized from the coating. The dissociation temperature of blocked isocyanates based on commercially utilized blocking agents decrease in the order: epsilon-caprolactam, phenols, methyl ethyl ketoxime, and active methylene compounds. Blocked isocyanates which are stable and water dispersible have been described by Rosthauser and Williams (Proceedings Polymeric Materials Science and Engineering; Vol. 50, pg. 344 (1984)). Catalysts which promote the urethane reaction are well known to the art and are illustrated by tertiary amines such as triethyl amine, bis(dimethylaminoethyl) ether and the like, organometallic salts of tin, mercury, zinc, bismuth and the like such as dibutyl tin diacetate, zinc octoate, phenyl mercuric acetate and bismuth octoate.

The amount of catalyst required to promote the reaction is dependent upon the curing conditions required in the coating process. Those skilled in the art may readily determine the catalyst level with a minimum of experimentation. In practice if a catalyst is desired it is usually in the level of 0.02 to about 1% based on the weight of the water dispersible organic polymer.

Background of the curing relations of hexamethoxymethylmelamine may be found in an article by R. Saxon et al. in J. Appl. Poly. Sci. 8, 475 (1964).

In the practice of this invention, one may also employ a mixture of at least one reactive urea derivative and at least one reactive carbamate derivative, the latter having the generic formula:

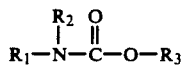

wherein each of $R_1$ and $R_2$ is a monovalent radical selected from the class consisting of hydrogen, alkyl groups having 1 to about 10 carbon atoms, hydroxyalkyl groups having 2 to about 4 carbon atoms and one or more hydroxyls, hydroxalkyleneoxy groups having one or more hydroxyl groups, and hydroxypolyalkyleneoxy groups having one or more hydroxyl groups, and $R_3$ is a monovalent radical selected from the class consisting of alkyl groups having 1 to about 10 carbon atoms, hydroxyalkyl groups having about 4 carbon atoms and one or more hydroxyl groups, hydroxyalkyleneoxy groups having one or more hydroxyl groups and hydroxypolyalkylenoxy groups having one or more hydroxyl groups, with the provisos that said carbamate contains at least one —NH and one —OH group or at least two —OH groups, and that $R_1$ and $R_2$ or $R_1$ and $R_3$ can be linked to form a ring structure.

The reactive carbamates used in this invention may be represented by the following:
2-hydroxyethyl 1-butylcarbamate
1-hydroxy-2-propyl 1-propylcarbamate
2-hydroxy-1-propyl 1-propylcarbamate
1-hydroxy-2-propyl 1-butylcarbamate
2-hydroxy-1-propyl 1-butylcarbamate
2-methyl-1-propyl 2-hydroxyethylcarbamate
2-propyl bis (2-hydroxyethyl) cabamate
2-hydroxyethyl 2-hydroxyethylcarbamate
2-hydroxyethyl (2-hydroxyethyl) (ethyl) carbamate
2,3-dihydroxy-1-propyl dimethylcarbamate
2,3-dihydroxy-1-propyl ethylcarbamate
1,3-dihydroxy-2-propyl 1-butylcarbamate
2,3-dihydroxy-1-propyl tetramethylenecarbamate
2-hydroxyethyl bis-(2-hydroxyethyl) carbamate
3-(2,3-dihydroxy-1-propyl) oxazolidone
5-(hydroxymethylene) oxazolidone
3-(2-hydroxyethyl)-5-(hydroxymethylene) oxazolidone
4-(hydroxymethylene) oxazolidone
2-hydroxyethyl carbamate
1-butyl 2,3-dihydroxy-1-propylcarbamate The invention is further described in the examples which follow. All parts and percentages are by weight unless otherwise specified.

EXAMPLE 1

Preparation of N-(2-Hydroxyethyl)-N,N'-Ethylene Urea

3555 Grams (34.2 moles) of aminoethylethanolamine and 3130 grams (34.8 moles) of dimethyl carbonate were charged to a 12-liter, 5-necked flask equipped with stirrer, heating mantle, water cooled condenser, distillation head, thermometer and nitrogen purge. The flask contents were heated to 80° C. and stirred for 3 hours before being allowed to stand overnight. The mixture was heated again while removing methanol and other volatile materials up to 195° C. kettle temperature and 140° C. vapor temperature. A total of 1960 grams of condensate was collected. The rest of the material in the flask was subjected to vacuum distillation giving material boiling 210° C. @ 1 mm Hg. A total of 3671 g of distillate and 412 g residue resulted from the distillation. The distilled product could be further purified by recrystallization from 2-butanone.

EXAMPLE 2

Preparation of N-Hydroxyethyl-N'-Butyl Urea 61.7 Grams (1 mole @ 99% purity) of ethanolamine and 170 grams of dichloromethane were charged to a flask equipped with stirrer, thermometer, feed tank, distillation head and condenser. 101 Grams (1 mole @ 98% purity) of butyl isocyanate was fed dropwise with stirring and cooling (dry ice bath) during 1.5 hrs. such that the temperature of the reaction mixture was maintained at about 30° C. At this time some solid had been formed and it was redissolved by heating to 46° C. The mixture was stirred at 46° C. for an additional two hours and then freed of volatile materials by stripping at 90° C. and 2 mm Hg leaving 181 g of solid product. This material could be recrystallized from 2-butanone giving tiny white crystals melting at 67° C.

EXAMPLE 3

Preparation of N-Hydroxypropyl-N'-Butyl Urea 75.1 Grams (1 mole) of 1-amino-2-propanol and 180 grams of dichloromethane were charged to a flask equipped as in Example 2. To the resulting mixture was added 101 grams (1 mole @ 98% purity) of butyl isocyanate dropwise with cooling and stirring during 1 hr 10 min and at a temperature of about 35° C. The resulting mixture was stirred another 2 hrs @ 40° C. and then stripped 2 hrs @ 80° C. and 2 mm Hg pressure leaving 178.4 g crude product which was a liquid. This material was 87 area % one component by gas chromatography.

EXAMPLE 4

N-(2-Hydroxyethyl)-N,N'-Ethylene Urea/Cargill-7451 Resin Crosslinked by Cymel 323

A water borne high solids coating composition was prepared by dissolving 16.22 parts of a carboxylated water dispersible organic polymer (Cargill®-7451) in 10.06 parts of hydroxyethyl ethylene urea. To the resulting solution was added 1.09 parts of triethylamine and the resulting mixture was then diluted with 47.11 parts of water. To this solution was then added 25.52 parts of aminoplast (Cymel™-323, American Cyanamid) to make a total of 100 parts. The resultant coating composition contained 46.7% non-volatiles and was cast (wet film thickness 1.2 mils) on a steel panel and cured at 250° F. for 40 minutes resulting in a hard, tough, glossy coating. A similar coating was prepared on aluminum foil and by extraction was found to be over 94% insoluble in boiling toluene.

EXAMPLE 5

Hydroxyethyl Ethylene Urea+Hydroxyethyl Butylcarbamate/Cargill-7451 Resin Crosslinked by Cymel-323

A water borne high solids coating composition was prepared by dissolving 16.20 parts of a carboxylated water dispersible organic polymer (Cargill®-7451) in 5.03 parts of hydroxyethyl butyl carbamate and 5.03 parts of hydroxyethyl ethylene urea. To the resulting solution was added 1.10 parts of triethylamine and the resulting mixture was then diluted with 47.10 parts of water. To this solution was then added 25.53 parts of aminoplast (Cymel®-323, American Cyanamid) to make a total of 100 parts. The resultant coating composition contained 46.7% non-volatiles and was cast (wet film thickness 1.2 mils) on a steel panel and cured at 225° F. for 40 minutes resulting in a hard, tough, glossy coating. A similar coating was prepared on aluminum foil and by extraction was found to be over 82% insoluble in boiling toluene.

EXAMPLE 6

Comparative Water Borne Coatings Composition Crosslinked by Cymel-323

A comparative coating composition of the prior art was prepared by dissolving 20.46 parts of the carboxylated water dispersible organic polymer (Cargill®-7451) in 12.69 parts of butoxyethanol. To the resulting solution was added 1.38 parts of triethylamine and the resulting mixture was then diluted with 59.48 parts of water. To this solution was then added 5.99 parts of aminoplast (Cymel®-323 American Cyanamid) to make a total of 100 parts. The resultant coating composition contained 25.3% non-volatiles, was cast (wet film thickness 1.2 mils) on a steel panel and cured at 250° F. for 15 minutes resulting in a hard, tough, glossy coating. A similar coating was prepared on aluminum foil and by extraction was found to be over 79% insoluble in boiling toluene.

EXAMPLE 7

Preparation of N,N'-bis-(2-Hydroxyethyl) Urea

Using the method of Example 1 excepting that each mole of aminoethyl ethanolamine is replaced by two moles of ethanolamine, a mixture containing N,N'-bis(2-hydroxyethyl) urea is obtained.

EXAMPLE 8

Preparation of N,N-bis-(2-Hydroxyethyl) Urea

Using the method of Example 1 excepting that each mole of aminoethyl ethanolamine is replaced by one mole of diethanolamine plus one mole of ammonia, a mixture containing N,N-bis-(2-hydroxyethyl) urea is obtained.

EXAMPLE 9

Preparation of Tetrakis-(2-Hydroxyethyl) Urea

Using the method of Example 1 excepting that each mole of aminoethyl ethanolamine is replaced by two moles of diethanolamine, a mixture containing tetrakis-(2-hydroxyethyl) urea is obtained.

EXAMPLE 10

Preparation of N,N'-bis-(3-Hydroxy-2,2-Dimethyl-1-Propyl) Urea

Using the method of Example 1 excepting that each mole of aminoethyl ethanolamine is replaced by two moles of 3-amino-2,2-dimethyl-1propanol, a mixture containing N,N'-bis-(3-hydroxy-2,2-dimethyl-1-propyl) urea was obtained.

EXAMPLE 11

Preparation of N,N'-bis-(2-hydroxyethyl)-N,N'-Dimethyl Urea

Using the method of Example 1 excepting that each mole of aminoethyl ethanolamine is replaced by two moles of N-methyl ethanolamine, a mixture containing N,N'-bis-(2-hydroxyethyl)-N,N'-dimethyl urea is obtained.

EXAMPLE 12

When Example 4 is followed except that a chemically equivalent amount of N,N'-dimethyl urea is substituted for N-(2-hydroxyethyl)-N,N'-ethylene urea, a hard, tough, glossy coating is obtained.

EXAMPLE 13

When Example 4 is followed except that a chemically equivalent amount of N-butyl-N'-(2-hydroxy-1-propyl) urea is substituted for N-(2-hydroxyethyl)-N,N'-ethylene urea, a hard, tough, glossy coating is obtained.

EXAMPLE 14

When Example 4 is followed except that a chemically equivalent amount of N,N'-(2-hydroxyethyl)-N,N'-dimethyl urea is substituted for N-(2-hydroxyethyl)-N,N'-ethylene urea, a hard, tough, glossy coating is obtained.

EXAMPLE 15

Preparation of N-Methyl-N'-Butyl Urea 280.32 Grams (3.84 moles) of butylamine and 300 ml of dichloromethane were charged to a round bottom flask equipped with stirrer, cold bath, thermometer, addition funnel and reflux condenser. 229.8 Grams (4.03 Moles, a 5% excess) of methyl isocyanate were charged to the addition funnel and added to the flask contents over four hours keeping the contents between 0° and 35° C. After an additional hour of stirring the exothermic reaction subsided and the mixture was allowed to stand overnight.

The mixture was freed of solvent and lights in a vacuum rotary evaporator leaving a white solid. Further drying in a vacuum desiccator gave material melting at 65°–68° C. The proposed structure of the product is in agreement with its proton NMR spectrum and infrared spectrum.

EXAMPLE 16

Preparation of N-Methyl-N'-Isopropyl Urea 284.9 Grams (4.81 moles) of isopropylamine were placed in a round bottom flask equipped with stirrer, thermometer, reflux condenser and addition funnel. 250.3 Grams (4.39 moles) of methyl isocyanate were charged to the addition funnel and added slowly to the flask with stirring. During the course of the reaction, solids began to precipitate and approximately 300 ml of toluene were added to maintain fluidity. After all of the methyl isocyanate had been added and the exothermic reaction had subsided, the heterogeneous mixture was heated to reflux and solids dissolved for transfer to a stripping flask. The mixture was freed of solvent and lights under vacuum on a rotary evaporator and with a hot water bath for heat input. The crude product (484.6 g, 95% crude yield) was 90.4 area % pure by gas chromatography and melted at 91°–97° C.

Mixtures of this material with 1-propyl-3-butyl urea exhibited significant melting range depressions. Addition of small amounts of liquid carbamates to these mixtures resulted in further melting range depressions such that the resulting mixtures were partly liquid at ambient temperature.

Differential scanning calorimetry of several binary mixtures of this material with N-propyl-N'-butyl urea indicated that a eutectic mixture of about 65% N-propyl-N'butyl urea and 35% N-methyl-N'-isopropyl urea existed and that its melting point was about 30° C. This is about a 40° to 60° C. melting point depression from that of the individual components.

EXAMPLE 17

N-Propyl-N'-Butyl Urea Preparation 205.76 Grams (3.48 moles) of n-propylamine were charged to a 1—l., round bottom flask equipped with stirrer, thermometer, reflux condenser and addition funnel. 313.7 Grams (3.16 moles) of butyl isocyanate were charged to the addition funnel and added to the flask with stirring at a rate which maintained the contents at about 60°-65° C. Toluene was added to dissolve the solid product for transfer to a stripping vessel. The crude product solution was about 92 area % ureas on a solvent-free basis by gas chromatography. The crude product solution was freed of most of the solvent and lights under vacuum with a rotary evaporator leaving 480.6 g of pale yellow solid melting from 68°-70° C. Infrared analysis showed a clean spectrum in agreement with the proposed structure's functionality. The gas chromatograph showed three, major peaks in a 1:2:1 ratio indicating possible 'scrambling' of alkyl groups and a statistically determined ratio of products.

EXAMPLE 18

N-Propyl-N'-Butyl Urea Preparation at Low Temperature 205.8 Grams (3.48 moles) of n-propylamine and 250 ml of dichloromethane were charged to a round bottom flask equipped with stirrer, thermometer, reflux condenser and dropping funnel. 313.7 Grams (3.16 moles) of butyl isocyanate were added to the dropping funnel and then metered into the flask with stirring and strong external cooling (solid $CO_2$ bath) at a rate slow enough to maintain the contents generally below 0° C. except for brief excursions to higher temperatures. The resulting mixture was left to stand overnight and then freed of solvent and lights under vacuum with a rotary evaporator leaving 462.3 g of crude product (92.6% crude yield). After further drying of a portion under vacuum a 97.6 area % purity was recorded by gas chromatography. The product contained substantially only one compound by gas chromatography. It melted at 70°-72° C.

As noted in Example 16, evidence for the existence of a eutectic between this compound and N-methyl-N'-isopropyl urea was obtained by differential scanning calorimetry.

EXAMPLE 19

Preparation of N-butyl-N'-(2-Ethyl-1-Hexyl) Urea 128.98 Grams (1 mole) of 2-ethyl-1-hexylamine and 500 ml of toluene were charged to a flask equipped with dropping funnel, thermometer, condenser, stirrer, Dean & Stark trap and condenser. The contents of the flask were refluxed for 3 hours to remove water, then cooled to 0° C. 99.6 Grams (1 mole) of butyl isocyanate were charged to the dropping funnel and added during 1 hr 5 min to the stirred flask contents. The flask contents remained at 30° C. or less during the addition.

The resulting crude reaction product was freed of the bulk of volatiles by stripping (final conditions 204° C. @ 1 atmos.). A small sample was distilled with the bulk of the material distilling 157°-164° C. @ 0.001 mm Hg.

A sample of distilled material was analyzed by GC showing three major product peaks in the approximate area ratio of 2:5:1 in order of decreasing volatility.

Although the invention has been described in its preferred forms with a certain degree of particularity, it is understood that the present disclosure has been made only by way of example and that numerous changes can be made without departing from the spirit and the scope of the invention.

We claim:

1. Method of making water-borne high solids coating compositions which comprises blending:
   (A) at least one water borne organic polymer free of amide groups which is interpolymerzable with reactive urea derivatives and crosslinking agents;
   (B) water;
   (C) at least one reactive urea derivative having the generic formula:

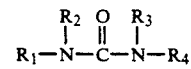

wherein each of $R_1$, $R_2$, $R_3$ and $R_4$ is a monovalent radical selected from the class consisting of hydrogen, alkyl groups having 1 to about 10 carbon atoms, hydroxyalkyl groups having 2 to about 4 carbon atoms and one or more hydroxyl groups, hydroxyalkyleneoxy groups having one or more hydroxyl groups and hydroxypolyalkyleneoxy groups having one or more hydroxyl groups and with the provisos that:
   (i) said urea contains at least one —NH and one —OH group or at least two —OH groups or at least two —NH groups;
   (ii) $R_1$ and $R_2$ or $R_1$ and $R_3$ can be linked to form a ring structure; and
   (iii) $R_1$, $R_2$, $R_3$ and $R_4$ are never all hydrogen at the same time;
   (D) a cross-linking amount of a cross-linking agent selected from the group consisting of a water-soluble polyepoxide, a water-dispersible polyepoxide, and a water-dispersible aminoplast; wherein for an aqueous dispersion coating the reactive urea derivative/water ratio is in the range of about 5 to 95 to about 30 to 70 and for an aqueous solution coating the reactive urea derivative/water ratio is in the range of about 20 to 80 to about 60 to 40.

2. Method claimed in claim 1 wherein $R_1$ is 2-hydroxyethyl, $R_2$ and $R_3$ are linked to form an ethylene bridge and $R_4$ is hydrogen.

3. Method claimed in claim 1 wherein $R_1$ and $R_3$ are hydrogen, $R_2$ is butyl and $R_4$ is hydroxyethyl.

4. Method claimed in claim 1 wherein $R_1$ and $R_3$ are each hydrogen, $R_2$ is methyl and $R_4$ is butyl.

5. Method claimed in claim 1 wherein $R_1$ and $R_3$ are each hydrogen, $R_2$ is propyl and $R_4$ is butyl.

6. Method claimed in claim 1 wherein $R_1$ and $R_3$ are each 2-hydroxyethyl, $R_2$ is ethyl and $R_4$ is hydrogen.

7. Method claimed in claim 1 wherein the organic polymer is a polyester alkyd resin.

8. Method claimed in claim 1 wherein the organic polymer is a carboxylated, hydroxyl containing epoxy fatty acid ester.

9. Method claimed in claim 1 wherein the organic polymer is a carboxylated polyester.

10. Method claimed in claim 1 wherein the organic polymer is a carboxylated alkyd resin.

11. Method claimed in claim 1 wherein the organic polymer is a carboxylated acrylic interpolymer.

12. Method claimed in claim 1 wherein the organic polymer is a homogeneously dispersed acrylic interpolymer.

13. Method claimed in claim 1 wherein the organic polymer is a carboxylated vinyl interpolymer.

14. Coating composition made by the method claimed in claim 1.

15. The method of claim 1 wherein the coating composition includes a catalytic amount of a cross-linking catalyst.

16. Method claimed in claim 1 wherein said waterborne, cross-linkable organic polymer is a water dispersible organic polymer.

17. Method claimed in claim 1 wherein said waterborne, cross-linkable organic polymer is a water soluble organic polymer.

18. Method claimed in claim 1 wherein the cross-linkable organic polymer free of amide groups is present in an amount of about 15 to 50 percent by weight, water is present in an amount of about 5 to 60 percent by weight, said reactive urea derivative is present in an amount of about 5 to 20 percent by weight and said crosslinking agent is present in an amount of about 5 to 30 percent by weight.

19. Coating composition made by the method of claim 2.

20. Coating composition made by the method of claim 7.

* * * * *